United States Patent
Peters et al.

(10) Patent No.: US 10,319,171 B2
(45) Date of Patent: Jun. 11, 2019

(54) MEDIA ESCAPE PREVENTION FOR SELF-SERVICE TERMINAL

(71) Applicant: NCR Corporation, Duluth, GA (US)

(72) Inventors: Kenneth J. Peters, Scotland (GB); Gordon Hanna, Scotland (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/228,858

(22) Filed: Mar. 28, 2014

(65) Prior Publication Data

US 2015/0279144 A1 Oct. 1, 2015

(51) Int. Cl.
| | |
|---|---|
| *G07D 11/14* | (2019.01) |
| *G07F 19/00* | (2006.01) |
| *G07D 11/40* | (2019.01) |
| *A46B 7/04* | (2006.01) |
| *A46B 3/00* | (2006.01) |
| *F16J 15/3288* | (2016.01) |
| *G07F 9/06* | (2006.01) |

(52) U.S. Cl.
CPC .............. *G07D 11/14* (2019.01); *A46B 3/00* (2013.01); *A46B 7/04* (2013.01); *F16J 15/3288* (2013.01); *G07D 11/40* (2019.01); *G07F 9/06* (2013.01); *G07F 19/202* (2013.01); *G07F 19/203* (2013.01); *G07F 19/205* (2013.01)

(58) Field of Classification Search
CPC . A46B 3/00; A46B 2200/40; A46B 2200/405; A46B 3/06; A46B 5/06; A46B 7/04; A46D 1/08; F16J 15/3288; G07D 11/0018; G07D 11/0081; G07D 11/14; G07D 11/40; G07F 19/20; G07F 19/201; G07F 19/202; G07F 19/203; G07F 19/205

USPC ........ 194/206, 207, 351, 344, 350; 209/534; 382/134–136; 235/379; 15/159.1, 194; 49/91.1; 198/323, 326, 333; 902/8–10, 902/12–17; 300/21

See application file for complete search history.

(56) References Cited

U.S. PATENT DOCUMENTS

| | | | | |
|---|---|---|---|---|
| 5,172,643 | A * | 12/1992 | Koshida et al. | 109/10 |
| 6,000,521 | A * | 12/1999 | Jung | 194/206 |
| 2003/0094848 | A1 * | 5/2003 | Shia | A46B 3/06 300/21 |
| 2003/0121971 | A1 * | 7/2003 | Lee | G06Q 20/1085 235/379 |
| 2003/0121973 | A1 * | 7/2003 | Lee | G07F 19/20 235/381 |
| 2005/0167138 | A1 * | 8/2005 | McCarthy | 174/53 |
| 2007/0034683 | A1 * | 2/2007 | Eastman | G07D 11/0006 235/379 |
| 2010/0083581 | A1 * | 4/2010 | Mattice | 49/475.1 |
| 2010/0127069 | A1 * | 5/2010 | Henton, Sr. | 235/379 |
| 2012/0210916 | A1 * | 8/2012 | Takashima | G07F 19/205 109/64 |
| 2015/0112479 | A1 * | 4/2015 | Koide | G07D 11/0042 700/244 |
| 2015/0170452 | A1 * | 6/2015 | Chugo | G07D 11/0018 194/206 |

(Continued)

*Primary Examiner* — Jeffrey A Shapiro

(74) *Attorney, Agent, or Firm* — Schwegman, Lundberg & Woessner

(57) ABSTRACT

A device includes a pocket having an opening to receive media. A filament assembly is coupled such that filaments protrude from a gap between the opening of the pocket and a self-service terminal (SST) in which the pocket is mountable to inhibit media from entering the gap.

15 Claims, 4 Drawing Sheets

(56) References Cited

U.S. PATENT DOCUMENTS

2015/0310691 A1* 10/2015 Cai .................... G07D 11/0003
  194/206
2015/0317858 A1* 11/2015 Suetaka ................ G07D 13/00
  194/351

* cited by examiner

MEDIA ESCAPE PREVENTION FOR SELF-SERVICE TERMINAL

BACKGROUND

Pocket style deposit/dispense Self-Service Terminals (SSTs), also referred to as recyclers, allow customers to deposit media, such as cash and bank notes, without the assistance of a clerk. The media is placed by the customer into a pocket in the SST, where the media is retrieved, processed, and stored securely. In some SSTs, a gap may exist between the pocket and other components of the SST where media may be unintentionally or intentionally inserted. Such media may be lost and unaccounted for during transactions, or may actually cause a mechanical issue with the SST. Costly downtime and servicing of the SST may be needed.

SUMMARY

In various embodiments, a brush-like structure is used to fill a gap in a pocket style recycler to prevent bank notes from escaping into the gap.

According to an embodiment, flexible filaments are supported within the gap to block bank notes from being inserted into the gap. The filaments may be mounted on a support, which is coupled to a side guide of the pocket such that the filaments extend up above the side guide. Each filament may be perpendicular to an arc formed by the side guide.

DETAILED DESCRIPTION

Figure 1:
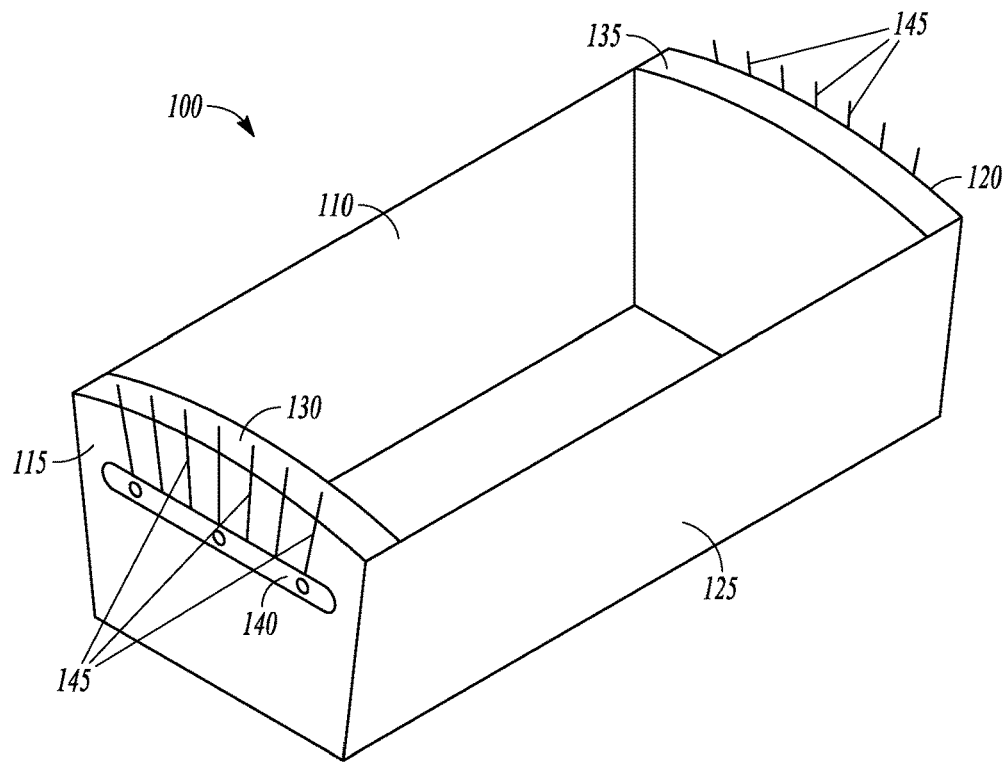
FIG. 1 is a block diagram of a portion of a recycler having a pocket and filament assembly according to an example embodiment.

FIG. 1 is a block diagram of a portion of a recycler having a pocket 100 and filament assembly 140 according to an example embodiment. The various components are illustrated and the arrangement of the components is presented for purposes of illustration only. It is to be noted that other arrangements with more or less components are possible without departing from the teachings presented herein.

Pocket 100 in one embodiment is for a self-service terminal (SST) such as an automated teller machine (ATM). Pocket 100 has an opening 110 to receive media. A user may insert media, such as bank notes, cash, checks, coupons, and other media into the pocket to perform a transaction with the SST. The pocket 100 may also dispense media, such as cash. Pocket 100 has side guides 115, 120 to help guide the media to a note picking face in a wall 125 of the pocket. The side guides have inner walls spaced from each other to facilitate placement of the media lengthwise between the side guides and parallel to the note picking face.

In one embodiment, when the pocket is installed in an SST, a gap may exist between walls of the SST, in which the pocket is inserted, and a top 130, 135 of the side guides 115, 120. Media may escape from the pocket via the gap, shown in greater detail in further figures. The gap may be an opening between a top of a side guide and a surface of the SST extending laterally from the opening of the pocket. A filament assembly 140 may be attached to an outside wall of the side guides. The filament assembly in one embodiment includes at least one filament 145. Multiple filaments are indicated at 145 that extend up above the top 130, 135 to protrude between the side guides and the SST and inhibit media from entering the gap. The filament assembly is coupled such that the filaments 145 protrude from the gap to inhibit media from entering the gap.

Figure 2:
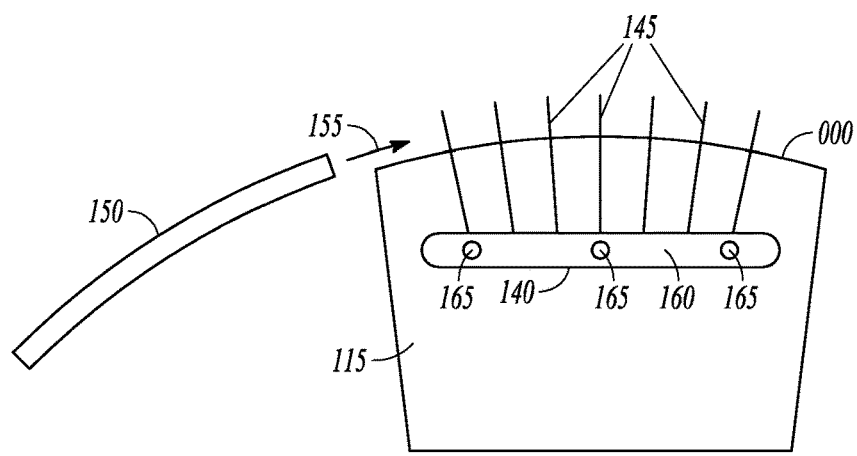
FIG. 2 is a side view of the pocket of FIG. 1.

The filaments 145 in one embodiment are formed of a flexible material, such as a polymer, and extend beyond the top of the side guides as shown in further detail in a side view of side guide 115 in FIG. 2. The filaments may be bristles, elastomeric material or similar material, and may have a cross section that is circular, oval, rectangular, cross shaped, other cross section suitable for flexing, yet inhibiting movement of media into the gap. The filaments may also present a surface cross section to the media that is large enough to prevent significant damage to media that is moved laterally in the pocket into contact with the filaments. In further embodiments, a higher density of filaments may be used to prevent such damage.

In one embodiment, the top 130 of the side guide 115 is curved in a convex manner forming an arc. A shutter 150 supported by the SST is positioned to moveably cover the opening, progressing from one end of the walls of side of the side guide 115 to the other end as indicated by arrow 155, contacting the filaments 145 and causing them to flex. In a further embodiment, the shutter 150 may comprise multiple shutters that meet to cover the opening 110 and at least to, the filaments 145. The filaments 145 maintain effectiveness in preventing media from escaping the pocket 100 through the gap when the shutter 150 is both open, exposing the opening for insertion or removal of media, and when closed. While seven filaments 145 are shown dispersed along a length of the top of the side guide, there may be fewer or more filaments 145 in further embodiments. More filaments 145 may be used to prevent torn off portions of media from escaping, while fewer filaments 145 may be used if only intact media are expected. The number and stiffness of the filaments 145 may be limited to ensure proper operation of the shutter 150.

In one embodiment, the side guides extend just below a surface of the SST, and the shutter of the SST is moveable from just below the surface of the SST to cover the opening of the pocket. This relative positioning of the cover and filaments ensures that the gap is blocked when the shutter is both open and closed in one embodiment. In further embodiments, the filaments may extend from the top of the side guides just enough to barely or almost contact the shutter when closed to inhibit media from entering into the gap.

In one embodiment, each filament may have a circular, oval, star shaped, cross shaped, rectangular, or other cross section having a diameter or width providing sufficient structural stiffness to inhibit later motion of media and may also substantially fill an opening between the side guide and SST walls in which the pocket is inserted. The filament length may extend orthogonal to the curved top of the side guide as shown in FIG. 2 or at an angle to the top of the side guide in further embodiments such that the filaments sufficiently block media from lateral movement when the shutter is both open and closed, without adversely interfering with operation of the shutter. In further embodiments, the tops of the side guides may be straight. Further, different shapes of filaments may be used as described above. In a further embodiment, multiple fibers in rows or a matrix may be used to block the gap.

Each filament may have a diameter or thickness providing flexibility sufficient to flex responsive to contacting a shutter of the SST that is mounted in the SST to slide over the pocket opening while contacting the filaments and causing the filaments to flex.

In one embodiment, the filament assembly comprises a base 160 that supports the filaments 145 to extend from the base 160 and extend through the gap. The base may be formed as a metal or other suitable material mounting plate coupled to the outside of respective side guides by screws or a snap fit structure, both of which are represented at 165. In one embodiment, the base is a piece of metal material that is bent about each filament and crimped to support the filament in a desired orientation.

Figure 3:
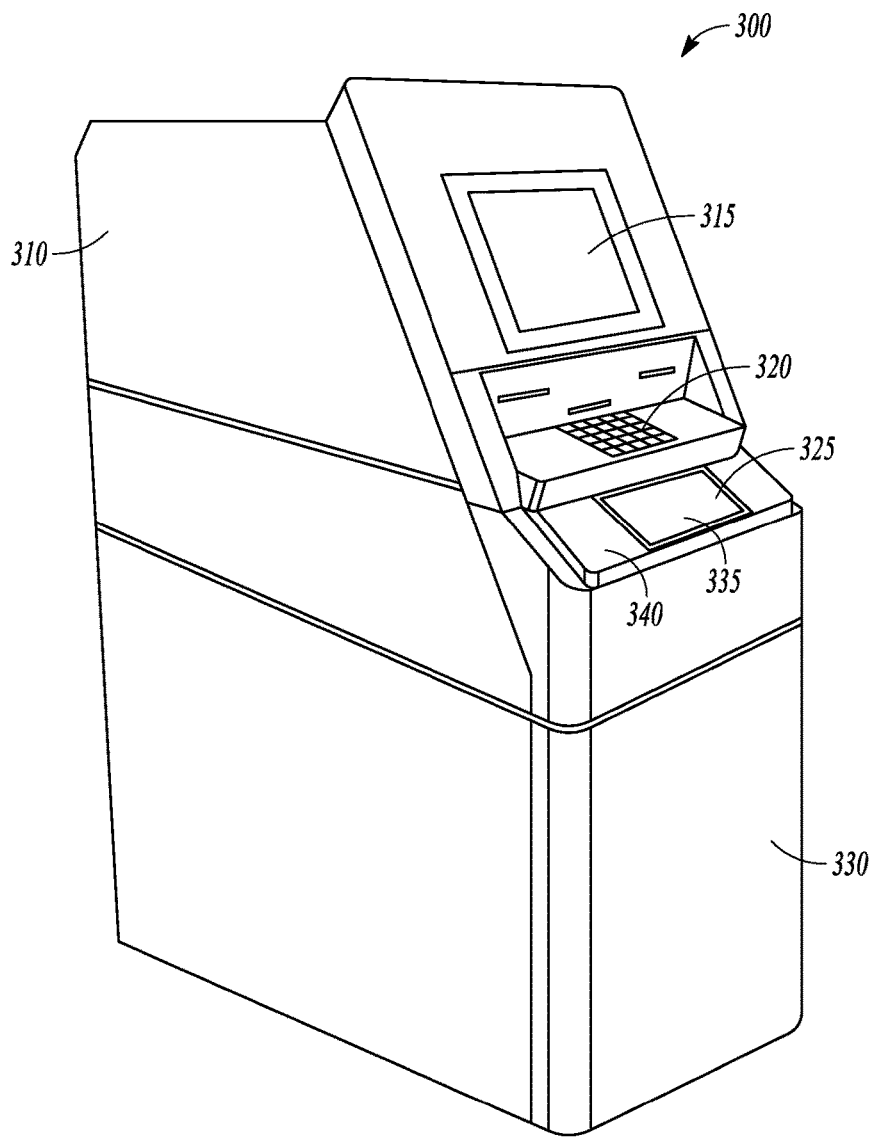
FIG. 3 is a perspective view of a self-service terminal having a recycler pocket according to an example embodiment.

FIG. 3 is a perspective block diagram view of an example SST 300. SST 300 may include a chassis 310 that supports multiple modules such as a customer display 315, an encrypting personal identification number (PIN) pad 320, a recycler 325 (or dispenser), a safe portion 330 and various other modules that are not shown for clarity of illustration, such as a receipt printer, a statement printer, a depository, a journal printer, a computer core, and other modules in different embodiments.

The recycler 325 may include a pocket as described above in FIGS. 1 and 2, but is not shown because a shutter 335 is covering the opening of the pocket. The pocket fits below a fascia 340 of the SST 300. The shutter may fit retractably on the recycler or the fascia 340 in various embodiments.

In one embodiment, the recycler may be located within the security enclosure 330, and is operable to receive media items and dispense media items previously received from a customer. The pocket may be located on the recycler, and the shutter may be located on the recycler or the SST fascia. There may be multiple shutters in further embodiments extending from different directions to cover the pocket opening.

Figure 4:
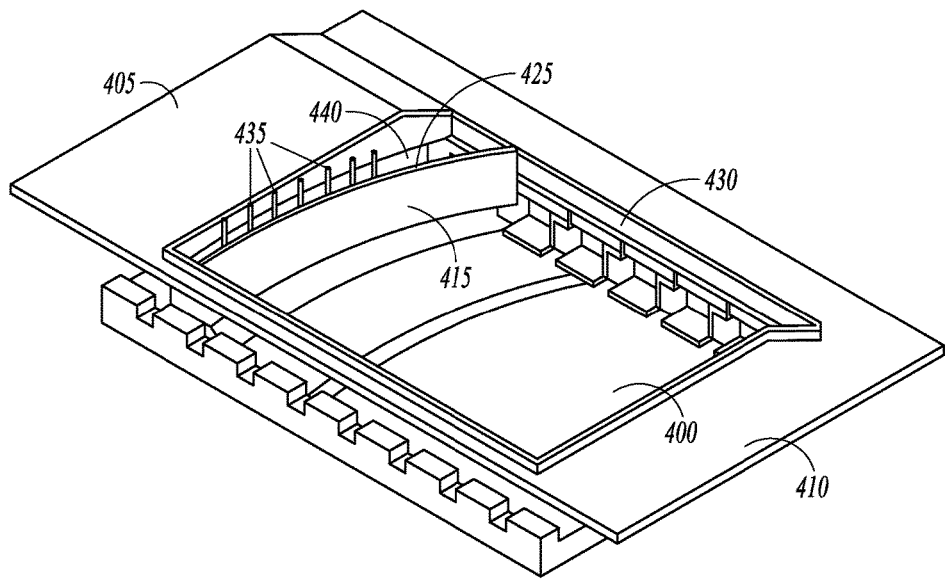
FIG. 4 is a perspective block diagram view of a recycler pocket having filaments to prevent lateral movement of media out of the pocket according to an example embodiment.

FIG. 4 is a perspective block diagram cut away view of a pocket 400 disposed within a fascia 405 of the recycler 410 of an SST. A pocket note side guide 415 has a top edge 425 spaced from the fascia 405 to allow a shutter to travel along the top edge 425 to selectively cover the opening of the pocket 400. The shutter is not shown, but may be housed beneath the fascia and extend out from a slot 430 from the SST toward a customer/user to cover the opening.

Multiple filaments 435 are shown extending from an outside edge of the note side guide 415. The filaments 435 are spaced apart along the top edge 425, which is shown as slightly curved in a convex manner, forming an arc. The shutter, when being closed to cover the opening slides along the top edge 425 of the note side guide 415, and may gently contact ends of the filaments 435, such that the filaments prevent lateral movement of notes out of the pocket and into a gap 440 between the top edge 425 and the fascia 405.

Figure 5:
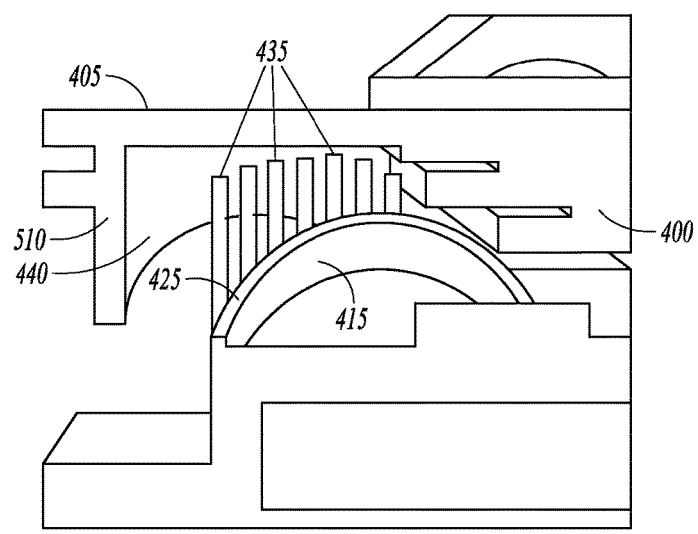
FIG. 5 is a perspective block diagram view of a recycler pocket disposed in an SST chassis fascia according to an example embodiment.

FIG. 5 is a cut away perspective block diagram view of a portion of the pocket 400 of FIG. 4 with respect to the fascia 405 of an SST. Multiple filaments 435 are shown extending above the top edge 425 of the note side guide 415. A fascia support rib 510 is shown, and the gap 440 is better illustrated as the space between the top edge 425 of the note side guide 415 and the fascia 405. The filaments 435 in one embodiment extend almost to a bottom side of the fascia 405. In further embodiments, the filaments 435 may extend all the way to the fascia to better prevent lateral movement of media out of the pocket 400.

Figure 6:
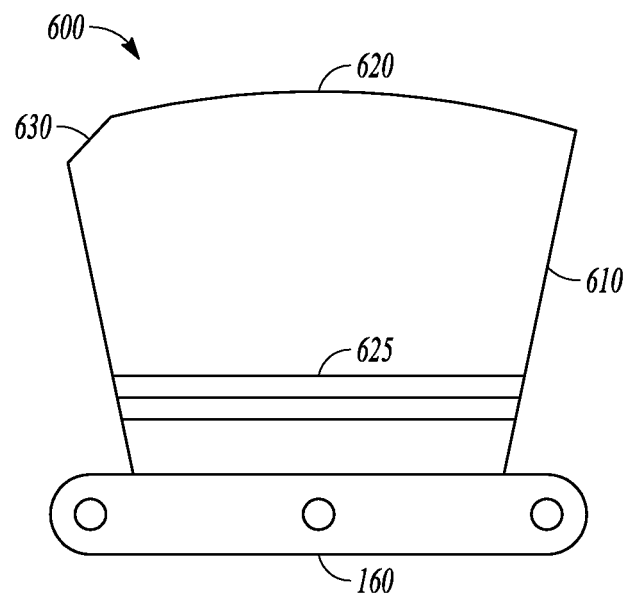
FIG. 6 is a side view block diagram of an alternative filament assembly having a single filament according to an example embodiment.

FIG. 6 is a side view block diagram of an alternative filament assembly 600 having a single filament 610. Filament 610 comprises a single flexible piece of Mylar®, plastic, or other suitable material, forming a strip extending along the top 130 of the pocket 100 to inhibit lateral movement of media from the opening 110. Filament 610 may be supported by base 160 along a length of the base 160, and may be rectangular in shape, or having a trapezoidal shape with an arced top edge 620 similar to the arc formed by an outline of various embodiments of filaments 145.

In operation, filament 610 may deflect toward or away from the pocket 100 as the shutter closes. In a further embodiment, the filament 160 may remain somewhat laterally stationary and deform in an accordion manner toward the base 160 when the shutter contacts the top edge 620 to allow the shutter to close while still inhibiting lateral movement of media.

In one embodiment, the filament 610 may also include a compressible portion 625 to enable the shutter to move the top edge 620 toward the base 160. The compressible portion may also be located within the base 160, such that the base maintains a lateral position of the filament 610 with respect to opening 110. In still further embodiments, the top edge 620 may include a ramped portion 630 to allow the shutter to gradually come into contact with the top edge 620 as the shutter begins to close over the opening 110.

Figure 7:
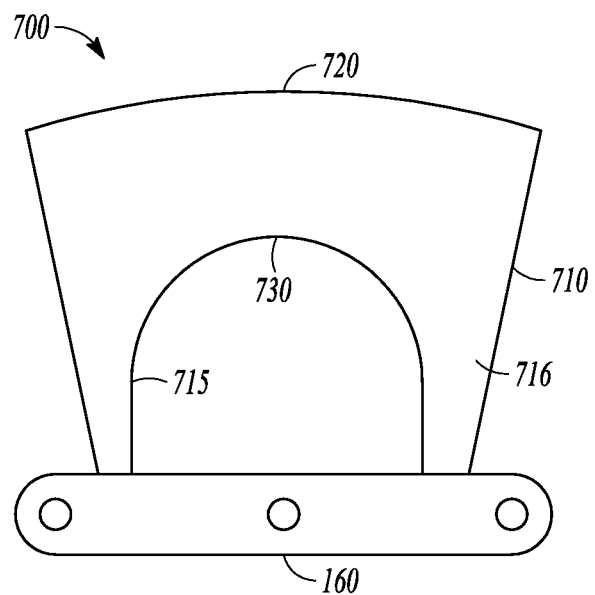
FIG. 7 is a side view block diagram of a further alternative filament assembly having a single filament according to an example embodiment.

FIG. 7 is a side view block diagram of a further alternative filament assembly 700 having a single filament 710. Filament 710 comprises a single flexible piece of Mylar, plastic, or other suitable material, forming a strip extending along the top 130 of the pocket 100 to inhibit lateral movement of media from the opening 110. Filament 710 may be supported by base 160 via two or more legs 715, 716 supported by base 160, and may be rectangular in shape, or having a trapezoidal shape with an arced top edge 620 similar to the arc formed by an outline of various embodiments of filaments 145.

In operation, filament 710 may move toward or away from the opening 110, or remain somewhat laterally stationary, with each leg 715, 716 accordioning toward the base 160 as the shutter contacts the arc 720 to allow the shutter to close while still inhibiting lateral movement of media. In one embodiment, the legs 715, 716 form an arced indicated at 730 forming an opening between the arc 730 and base 160. The opening may be polygonal in shape in further embodiments, such as rectangular for example. Filament 710 may have similar compressible portions as in filament 610 in some embodiments, and may also include a ramped portion.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A device comprising:
a pocket having an opening to receive media and dispense media;
the pocket including:
a first side guide and a second side guide situated at opposite ends of the pocket;
a first top of the first side guide and a second top of the second side guide that are curved in convex arches;
a first wall adjacent and attached to an inner side of the first side guide and an opposing side of the first wall adjacent and attached to an inner side of the second side guide; and
a second wall adjacent and attached to a second inner side of the first side guide and an opposing side of the second wall adjacent and attached to a second inner side of the second side guide;
a filament assembly coupled such that it protrudes from a gap between the opening of the pocket and a self-service terminal (SST) in which the pocket is mountable to inhibit media from entering the gap, wherein the filament assembly is arranged in an arc arrangement that is orthogonal to a convex arch of the first top of the first side guide and along a top edge of the filament assembly and each filament comprising a snap fit structure at a bottom to snap into a base, wherein the filament assembly includes a compressed portion located adjacent to the bottom on the base, wherein the compressed portion is adapted so the base maintains a lateral position of each filament with respect to the opening, and wherein the filament assembly includes a ramped portion on the top edge of the filament assembly and the ramped portion is adapted to allow a shutter to gradually come into contact with the top edge, wherein the base is affixed to an outer surface of the first side guide, and wherein the filament assembly extends from the top edge of the first side guide to the shutter of the SST, wherein the arc arrangement is configured to prevent lateral movement of the media when received in the pocket, and wherein a filament cross-section surface for the filament assembly is configured to be large enough to prevent damage to the media when the media is moved through the pocket, wherein the filament assembly includes seven filaments; and
the shutter is configured to moveably cover an opening in the gap between the first and second tops of the first and second side guides and a surface of the SST extending laterally from the opening, wherein the shutter is configured to moveably cover the opening, progressing from one end of the first and second side guides to another end, contacting the filament to cause the filament to flex.

2. The device of claim 1 wherein the pocket comprises the first and second side guides are spaced to facilitate placement of bank notes lengthwise between the first and second side guides.

3. The device of claim 2 wherein the filament assembly comprises multiple filaments formed of a flexible material and are dispersed along a length of the first and second tops of the pocket note side guides.

4. The device of claim 3 wherein the filament assembly is mounted on an outside of one of:
the first side guide and the second side guide, and wherein the device further comprises a second filament assembly mounted on an outside of the other pocket note side guide.

5. The device of claim 4 wherein the first and second side guides extend just below a surface of the SST such that the shutter of the SST is moveable to cover the opening of the pocket.

6. The device of claim 3 wherein each filament has a thickness providing flexibility sufficient to flex responsive to contacting the shutter of the SST that is mounted in the SST to slide over the pocket opening while contacting the filaments and causing the filaments to flex.

7. The device of claim 1 wherein the filament assembly comprises a single flexible vertical strip.

8. A self-service terminal (SST), comprising
a media pocket defining an opening and a pair of spaced side guides, wherein the media pocket includes a pair of opposing side walls and each side wall attached to inner walls of the side guides that enclose the media pocket, and wherein the media pocket is adapted to receive media and dispense media, and wherein tops of the side guides are curved in convex arches;
a shutter moveable to expose and cover the opening of the media pocket, wherein the shutter is configured to moveably cover the opening in the gap, progressing from one end of the side guides to another end, contacting the filament to cause a portion of one of a pair of filament assemblies to flex; and
the pair of filament assemblies, each filament assembly comprising a snap fit structure at a bottom to snap into a base, wherein each pair of filament assemblies includes a compressed portion located adjacent to the bottom on the base, wherein the compressed is portion adapted so the base maintains a lateral position of each filament with respect to the opening, and wherein each pair of the filament assemblies includes a ramped portion on a top edge of that pair and the ramped portion is adapted to allow a shutter to gradually come into contact with the top edge, wherein the base is coupled to an outer surface and outer wall of the side guides and containing deformable filaments that extend upward from the outer surface of the side guides to the shutter and to prevent media from entering a gap between the shutter and the side guides, wherein each filament assembly is arranged in an arc arrangement along the top edge of that filament assembly that is orthogonal to the convex arches of the tops of the side guides, and wherein the arc arrangement is configured to prevent lateral movement of the media when received in the media pocket, wherein a filament cross-section surface for the filament assembly is configured to be large enough to prevent damage to the media when the media is moved through the pocket, wherein the filaments comprise seven deformable filaments.

9. The SST of claim 8 wherein the pocket further comprises a note picking face extending into the pocket and extending between inner surfaces of the side guides, wherein the note picking face is formed to accept and pick media oriented parallel to the note picking face and orthogonal to the gap.

10. The SST of claim 8 and further comprising:
a chassis supporting a display device, an encrypting keypad, a card reader, a printer, the shutter, and the media pocket, wherein the gap comprises an opening between a top of the side guides and the face of the middle box extending laterally from the opening of the pocket.

11. The SST of claim 10 wherein the filaments are formed of a flexible material and wherein the side guides extend at least to a top of the gap such that the shutter is moveable to cover the opening of the pocket.

12. The SST of claim 11 wherein each filament has a circular cross section having a diameter suitable to resist insertion of media into the gap.

13. The SST of claim 11 wherein each filament has a thickness providing flexibility sufficient to flex responsive to contacting the shutter as the shutter is slid over the pocket while contacting the filaments and causing the filaments to flex.

14. A method comprising:
receiving and dispensing media in a self-service terminal (SST) pocket having an opening and a media picking face extending between two media side guides, wherein the pocket includes a pair of opposing inner walls and each side wall attached to side walls that enclose the pocket, and wherein tops of the media side guides are curved in convex arches; and closing a shutter over the opening and two media side guides, wherein the shutter contacts and flexes a top portion of a set of filaments on filament assemblies that are snapped at bottoms into bases with a snap fit structure and the bases are coupled to outer walls of the side guides and extending from a top edge of the outer walls toward the opening having the shutter and at a distance to inhibit media from entering respective gaps between the tops of the media side guides and a panel of the SST, and arranging each filament assembly arranged in an arch arrangement that is orthogonal to the convex arches of the tops of the media side guides and along a top edge of that filament assembly such that the arc prevents lateral movement is prevented when media is received the SST pocket and wherein filament cross-section surfaces for the filament assemblies are large enough to prevent damage to the media when the media is moved through the pocket, wherein the set of filaments comprise seven filaments, and arranging each filament assembly with a compressed portion located adjacent to the bottom on the base, wherein the compressed portion is adapted so the base maintains a lateral position of each filament assembly with respect to the opening, and wherein each filament assembly includes a ramped portion on the top edge of that filament assembly and the ramped portion is adapted to allow the shutter to gradually come into contact with the top edge, wherein.

15. The method of claim 14 wherein the filaments flex responsive to contacting the shutter.

* * * * *